United States Patent
Blanchard

(10) Patent No.: US 7,280,496 B2
(45) Date of Patent: Oct. 9, 2007

(54) METHODS AND APPARATUS FOR COUPLING A SATELLITE TO AN EARTH TERMINAL

(75) Inventor: Scott D. Blanchard, Mesa, AZ (US)

(73) Assignee: General Dynamics Corporation, Scottsdale, AZ (US)

( * ) Notice: Subject to any disclaimer, the term of this patent is extended or adjusted under 35 U.S.C. 154(b) by 1036 days.

(21) Appl. No.: 10/211,793

(22) Filed: Aug. 2, 2002

(65) Prior Publication Data

US 2004/0022206 A1    Feb. 5, 2004

(51) Int. Cl.
| | |
|---|---|
| H04B 7/185 | (2006.01) |
| H04J 3/04 | (2006.01) |
| H04K 1/02 | (2006.01) |
| H04L 25/03 | (2006.01) |
| H04L 25/49 | (2006.01) |
| H04L 27/08 | (2006.01) |
| H04Q 7/20 | (2006.01) |

(52) U.S. Cl. ............ 370/316; 370/535; 375/296; 375/345; 455/427

(58) Field of Classification Search ........ 370/316–319, 370/477, 535; 375/229–230, 296, 345; 455/427, 455/12.1
See application file for complete search history.

(56) References Cited

U.S. PATENT DOCUMENTS

| | | | |
|---|---|---|---|
| 4,558,302 A | 12/1985 | Welch | |
| 4,701,745 A | 10/1987 | Waterworth | |
| 5,612,978 A | 3/1997 | Blanchard et al. | |
| 5,619,525 A * | 4/1997 | Wiedeman et al. | ......... 375/130 |
| 5,825,762 A | 10/1998 | Kamin, Jr. et al. | |
| 5,834,972 A | 11/1998 | Schiemenz, Jr. et al. | |
| 5,940,445 A | 8/1999 | Kamin, Jr. | |
| 6,157,681 A | 12/2000 | Daniel et al. | |
| 2002/0191630 A1 * | 12/2002 | Jacobsen | ................. 370/430 |

OTHER PUBLICATIONS

"Universal Noiseless Coding", Lee D. Davisson, IEEE Transactions on Information Theory, Nov. 1973, vol. 19, No. 6, pp. 783-795.
"Sequence Time Coding For Data Compression", Thomas J. Lynch, IEEE, Oct. 1966, vol. 54, pp. 1490-1491.

(Continued)

*Primary Examiner*—Kevin C. Harper
(74) *Attorney, Agent, or Firm*—Ingrassia Fisher & Lorenz, P.C.

(57) ABSTRACT

Methods and apparatus are provided for coupling a satellite to an earth terminal. The apparatus inputs of the satellite that is configured to receive digital uplink signals, an autoscaling digital multiplexer of the satellite that is configured to digitally multiplex the digital uplink signals to produce a digital composite signal, and a digital modulator of the satellite that is configured to digitally modulate the digital composite signal to produce a digitally modulated composite signal. In addition, the apparatus comprises an input of the earth terminal that configured to receive the digitally modulated composite signal and a digital demodulator of the earth terminal that is configured to digitally demodulate the digitally modulated composite signal received by the input of the earth terminal to produce a second digital composite signal. Furthermore, the apparatus comprises an autoscaling digital demultiplexer of the earth terminal that is configured to digitally separate the second digital composite signal into digital uplink signals, and a modulator of the earth terminal configured to modulate the digital uplink signals to produce modulated analog signals.

35 Claims, 7 Drawing Sheets

OTHER PUBLICATIONS

"Universal Codeword Sets and Representations of the Integers", Peter Elias, IEEE Transactions on Information Theory, Mar. 1975, vol. 21, No. 2, pp. 194-203.

"A Method For Construction Of Minimum-Redundancy Codes", David A. Huffman, Proceedings of the Institute of Radio Engineers, Sep. 1952, vol. 40, pp. 1098-1101.

Universal Coding, Information, Prediction, And Estimation, Jorma Rissanen, IEEE Transactions on Information Theory, Jul. 1984, vol. 30, No. 4, pp. 629-636.

"Universal Modeling and Coding", Jorma Rissanen and Glen G. Langdon, Jr., IEEE Transactions on Information Theory, Jan. 1981, vol. 27, No. 1, pp. 12-23.

A Universal Algorithm for Sequential Data Compression, Jacob Ziv and Abraham Lempel, IEEE Transactions on Information Theory, May 1977, vol. 23, No. 3, pp. 337-343.

"Compression Of Individual Sequences Via Variable-Rate Coding", Jacob Ziv and Abraham Lempel, IEEE Transactions on Information Theory, Sep. 1978, vol. 24, No. 5, pp. 530-536.

\* cited by examiner

METHODS AND APPARATUS FOR COUPLING A SATELLITE TO AN EARTH TERMINAL

BACKGROUND OF THE INVENTION

The present invention generally relates to satellite communication systems, and more particularly to apparatus and methods for coupling a satellite to an earth terminal.

Satellite-based communication systems have continued to evolve and have become an important component of modern society. Numerous applications are supported by satellite-based communication systems that provide wide area coverage, such as worldwide television, communications to remote areas, wide area data networks, global personal communications to hand-held portable telephones, broadband voice, video, and/or data. As the number of applications supported by satellite-based communication systems has increased and the number of users using the applications has increased, processes have been developed to accommodate the increased number of applications and users.

One process that has been developed to accommodate the increased number of applications and users is multiplexing. The process of multiplexing allows multiple signals to be sent on a single channel, and many forms of multiplexing have been developed to generate a multiplexed communication signal, including, but not limited to time multiplexing, frequency multiplexing, space multiplexing (e.g., Frequency-Division Multiplexing (FDM), Time-Division Multiplexing (TDM), Space-Division Multiplexing (SDM), Orthogonal Frequency Multiplexing (OFM), Code-Division Multiple Access (CDMA) multiplexing, Wideband CDMA (WCDMA) multiplexing, Time-Division Multiple Access multiplexing, Orthogonal Frequency Multiple Access (OFMA) multiplexing, and Frequency Division Multiple Access multiplexing (FDMA)). While multiplexing has increased the number of signals that can be sent on a single channel to accommodate numerous applications and users, additional complications are introduced when multiplexing is utilized in satellite-based communication systems.

For example, existing and proposed satellite-based communication systems (e.g., wideband CDMA Mobile Satellite Systems (MSS)) use an analog, frequency division multiplexed (FDM) channelized approach that maps each uplink beam and carrier, which is typically an L or S band carrier, to a specific gateway downlink frequency, which is typically a C, X or Ka band carrier. This analog FDM channelized approach directly couples the user uplink to the earth terminal downlink, so that fading or other power variation in the earth terminal downlink results in uncontrolled power variations in the measurement of the user uplink, thereby degrading the ability to accurately set the user uplink power level. In addition, the use of the analog FDM channelized approach introduces nonlinearities, which generally results in an increase in the noise floor due to intermodulation distortion, such that the presence of a few high capacity, and hence high power beams, will undesirably increase the noise power of other beams and channels. Also, a large external interfere in one beam can also undersirably increase the noise in other beams and carriers due to this nonlinearity. Furthermore, the introduction of nonlinearities will also generally degrade power control as large carrier codes will be affected to a greater extent than small carrier codes due to a tendency for the large carrier codes to become compressed prior to the small carrier codes. As can be appreciated by those of ordinary skill in the art, the foregoing effects reduce the likelihood of implementing numerous tasks, such as digital beam forming, on the satellite as the relative amplitude and phase characteristics between channels, corresponding to different feed elements, are altered in a unpredictable manner.

To overcome issues such as power control and linearity, processing on-board the satellite has been proposed to generate the multiplexing signal (e.g., CDMA signal). However, increasing the processing on-board the satellite typically increases the cost of the satellite. Furthermore, the initial configuration of the satellite to support a particular multiplexing waveform (e.g., CDMA signal) is generally unalterable during the lifetime of the satellite.

In view of the foregoing, it should be appreciated that it would be desirable to provide apparatus and methods for coupling a satellite to an earth terminal that addresses the foregoing and other deficiencies of satellite-based communication systems that are not specifically or inferentially addressed in this background of the invention. Furthermore, additional desirable features provided by the invention will become apparent to one skilled in the art from the drawings, foregoing background of the invention, following detailed description of the drawings and appended claims.

BRIEF SUMMARY OF THE INVENTION

In accordance with the present invention, an apparatus is provided for coupling a satellite to an earth terminal. The apparatus comprises inputs of the satellite that is configured to receive digital uplink signals, an autoscaling digital multiplexer of the satellite that is configured to digitally multiplex the digital uplink signals to produce a digital composite signal, and a digital modulator of the satellite that is configured to digitally modulate the digital composite signal to produce a digitally modulated composite signal. In addition, the apparatus comprises an input of the earth terminal that configured to receive the digitally modulated composite signal and a digital demodulator of the earth terminal that is configured to digitally demodulate the digitally modulated composite signal received by the input of the earth terminal to produce a second digital composite signal. Furthermore, the apparatus comprises an autoscaling digital demultiplexer of the earth terminal that is configured to digitally separate the second digital composite signal into digital uplink signals, and a modulator of the earth terminal configured to modulate the digital uplink signals to produce modulated analog signals.

In accordance with the present invention, a method is also provided for coupling a satellite to an earth terminal. The method comprises receiving digital uplink signals with inputs of the satellite, digitally multiplexing the digital uplink signals with an autoscaling digital multiplexer of the satellite to produce a digital composite signal, and digitally modulating the digital composite signal with a digital modulator of the satellite to produce a digitally modulated composite signal. In addition, the method comprises receiving the digitally modulated composite signal with an input of the earth terminal, and digitally demodulating the digitally modulated composite signal with a digital demodulator of the earth terminal to produce a second digital composite signal. Furthermore, the method comprises digitally separating the second digital composite signal into digital uplink signals with an autoscaling digital demultiplexer of the earth terminal, and modulating the digital uplink signals with a modulator of the earth terminal to produce modulated analog signals.

BRIEF DESCRIPTION OF THE DRAWINGS

The present invention will hereinafter be described in conjunction with the appended drawing figures, wherein like numerals denote like elements, and.

DETAILED DESCRIPTION OF THE DRAWINGS

The following detailed description of the drawings is merely exemplary in nature and is not intended to limit the invention or the application and uses of the invention. Furthermore, there is no intention to be bound by any theory presented in the preceding background of the invention or the following detailed description of the drawings.

Figure 1:
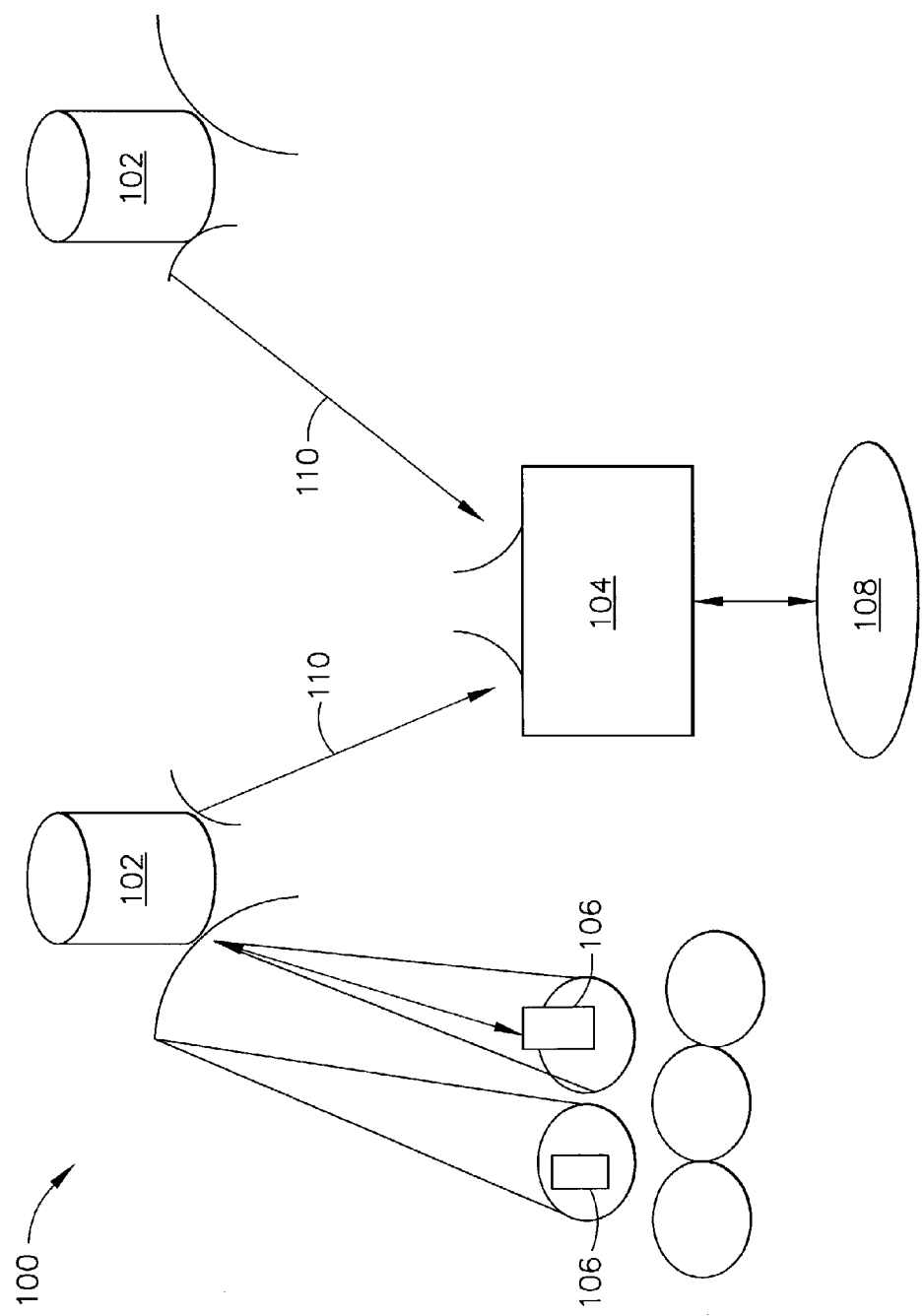
FIG. 1 is a simplified illustration of a communication system according to a preferred exemplary embodiment of the present invention.

Referring to FIG. 1, a simplified illustration of a communication system 100 is presented according to a preferred exemplary embodiment of the present invention. The subsequently described apparatus and corresponding methods of the present invention are preferably utilized in a satellite-based communication system. As can be appreciated by one of ordinary skill in the art, the principles discussed herein can be readily applied to numerous satellite-based, radio, cable television (CATV), telephony as well as other data, voice video or a combination data, video and/or voice communications systems. Furthermore, as can be appreciated by one of ordinary skill in the art, the principles discussed herein can also be readily applied to other satellite-based systems such as RF monitoring and surveillance, direct finding, RADAR, and sonar.

The communication system 100 comprises at least one satellite 102, and preferably comprises multiple satellites 102 forming a satellite constellation. The satellites 102 are preferably located in geosynchronous orbits relative to a celestial body, such as the earth. However, the satellites 102 can be located in any number of orbits relative to a celestial body according to the present invention. For example, the satellites 102 can be located in a low earth orbit, medium orbit, and/or a polar orbit as known to those of ordinary skill in the art.

The satellite 102 or satellites 102 of the communication system 100 are configured to couple an earth terminal 104 of the communication system 100 to user equipment 106, other earth terminals (not shown), and/or other communication systems. The satellite 102 is preferably coupled to the user equipment 106 with multiple beams and communication links in order improve the link margin that is available with a single beam. The earth terminal 104 is preferably configured to connect one or more elements of the communication system 100 to other communication systems (not shown) or a network 108 or networks, such as public networks, cellular networks, and/or private networks (e.g., Public Switched Telephone Network (PSTN) and the Public Land Mobile Network (PLMN)). In addition, the earth terminal 104 is preferably coupled to the satellite 102 with a digitally modulated composite signal 110.

Figure 2:
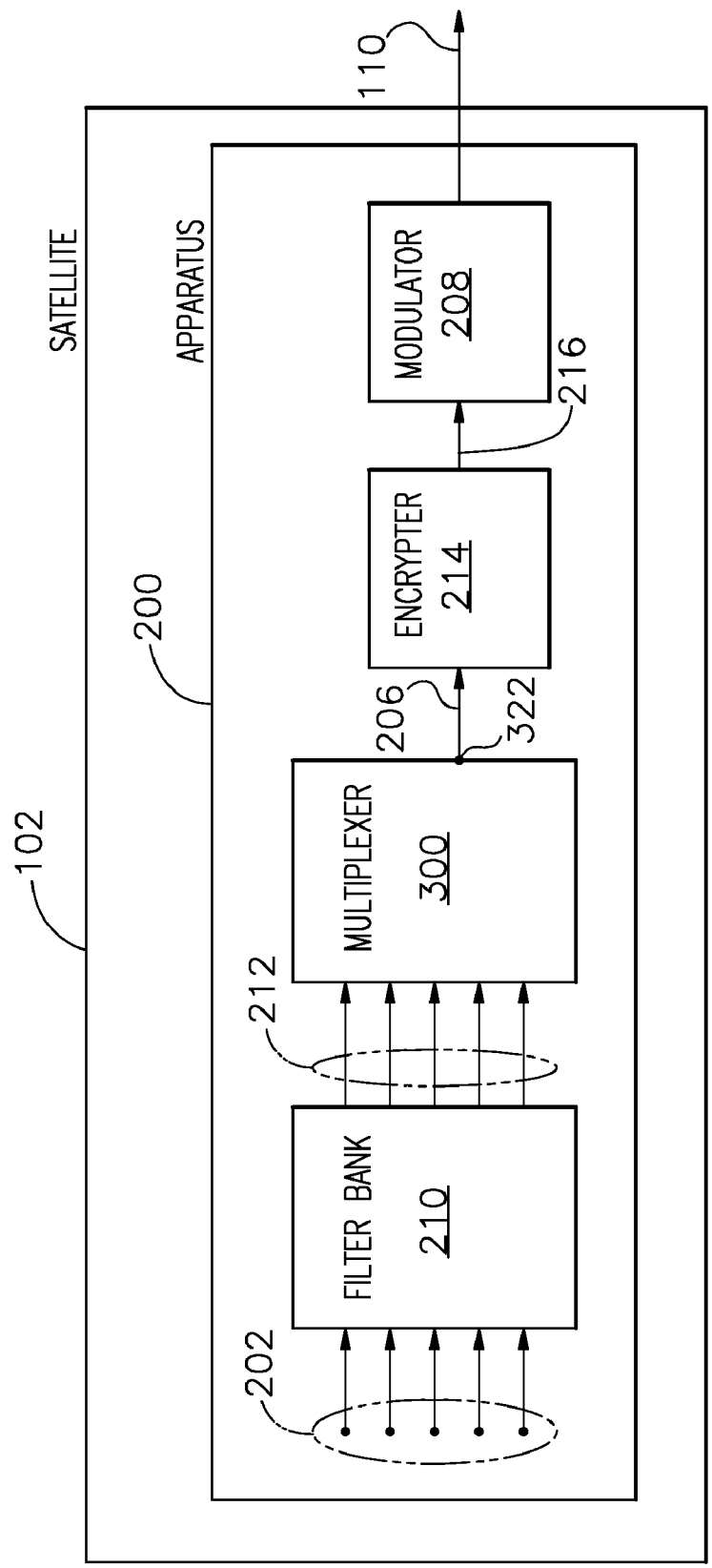
FIG. 2 is a simplified illustration the satellite of FIG. 1 having an apparatus for coupling the satellite to an earth terminal according to a preferred exemplary embodiment of the present invention.

Referring to FIG. 2, a simplified illustration is presented of the satellite 102 having an apparatus 200 for coupling the satellite 102 to the earth terminal 104 as shown in FIG. 1 with a digitally modulated composite signal 110 (i.e., providing a downlink from the satellite 102 to the earth terminal 104 according to a preferred exemplary embodiment of the present invention). Generally, the apparatus 200 comprises multiple inputs 202 of the satellite 102 that are configured to receive digital uplink signals, which are a digital representation of the sum of uplink signals received by the satellite from user equipment 106, and an autoscaling digital multiplexer 300 that is configured to receive the digital uplink signals received at the multiple inputs 202. According to a preferred embodiment of the present invention, there is at least one digital uplink signal for each beam, and more preferably one digital uplink signal for each carrier-beam pair. The autoscaling digital multiplexer 300 is configured to digitally multiplex the digital uplink signals and produce a digital composite signal 206. A digital modulator 208 of the satellite 102 is configured to digitally modulate the digital composite signal 206 to produce the digitally modulated composite signal 110.

The digital uplink signals received at the multiple inputs 202 are preferably binary encoded analog waveforms that can be generated using digital signal processing techniques known to those of ordinary skill in the art. Preferably, the digital uplink signals have been preprocessed with low noise amplification, amplification, frequency conversion, and filtering in addition to digitization. The digital uplink signals preferably represent received analog signals that are the composite of multiple digitally encoded, modulated, spread, and/or multiplexed information streams, external uplink interference and system noise. According to a preferred embodiment of the present invention, the digital uplink signals are Third Generation Partnership Project (3GPP) Wideband Code Division Multiple Access (WCDMA) Direct Sequence Spread Spectrum (DSSS) signals containing multiple data and/or voice users using different spreading codes. However, the present invention is applicable to digital uplink signals in other modulation and multiple access schemes based upon spread-spectrum communication, such as Code Division Multiple Access (CDMA), Frequency Division Multiple Access (FDMA), Time Division Multiple Access (TDMA), or the like.

In accordance with a preferred embodiment of the present invention, the digital uplink signals received at the multiple inputs 202 are provided to a digital filter bank 210 prior to the digital multiplexing by the digital multiplexer 300, to generate filtered digital uplink signals 212. The digital uplink signals received at the multiple inputs 202 are preferably provided to the digital filter bank 210 for filtering to reduce undesired narrowband interfering signals. The digital filter bank 210 can be implemented with any number of techniques and apparatus. For example, the digital filter bank 210 can be formed of a bank of finite impulse response (FIR), infinite impulse response, (IIR) or combination filter, a frequency domain filter bank, such as a bank of FFT/IFFT, or other well known approaches. In a preferred embodiment, the digital filter bank is a bank of adaptive interference mitigation filters. An example of a bank of adaptive interference mitigation filters is described in U.S. Pat. No. 5,612,978, titled "METHOD AND APPARATUS FOR REAL-TIME ADAPTIVE INTERFERENCE CANCELLATION IN DYNAMIC ENVIRONMENTS," issued on Mar. 18, 1997 to Blanchard. et al, which is hereby incorporated by reference (hereinafter referred to as the "Blanchard Reference"). With the example provided in the Blanchard Reference, only the FFT, IFFT and scaling function are preferably utilized for implementation of the digital filter bank 210, the bin-weight calculator can be located either on the satellite or at the earth terminal. Also, the update rate for updating the bin-weights can reduced for less dynamic environments.

The digital filter bank 210 mathematically filters the digital uplink signals to reduce the signal power due to external interference. As a result, while each of the digital uplink signals may originally have a significant proportion of the power that is due to undesired signals, the filtered digital uplink signals 212 produced by the digital filter bank will preferably have reduced the amount of power associated with undesired signals originally provided to digital filter bank 210.

Figure 3:
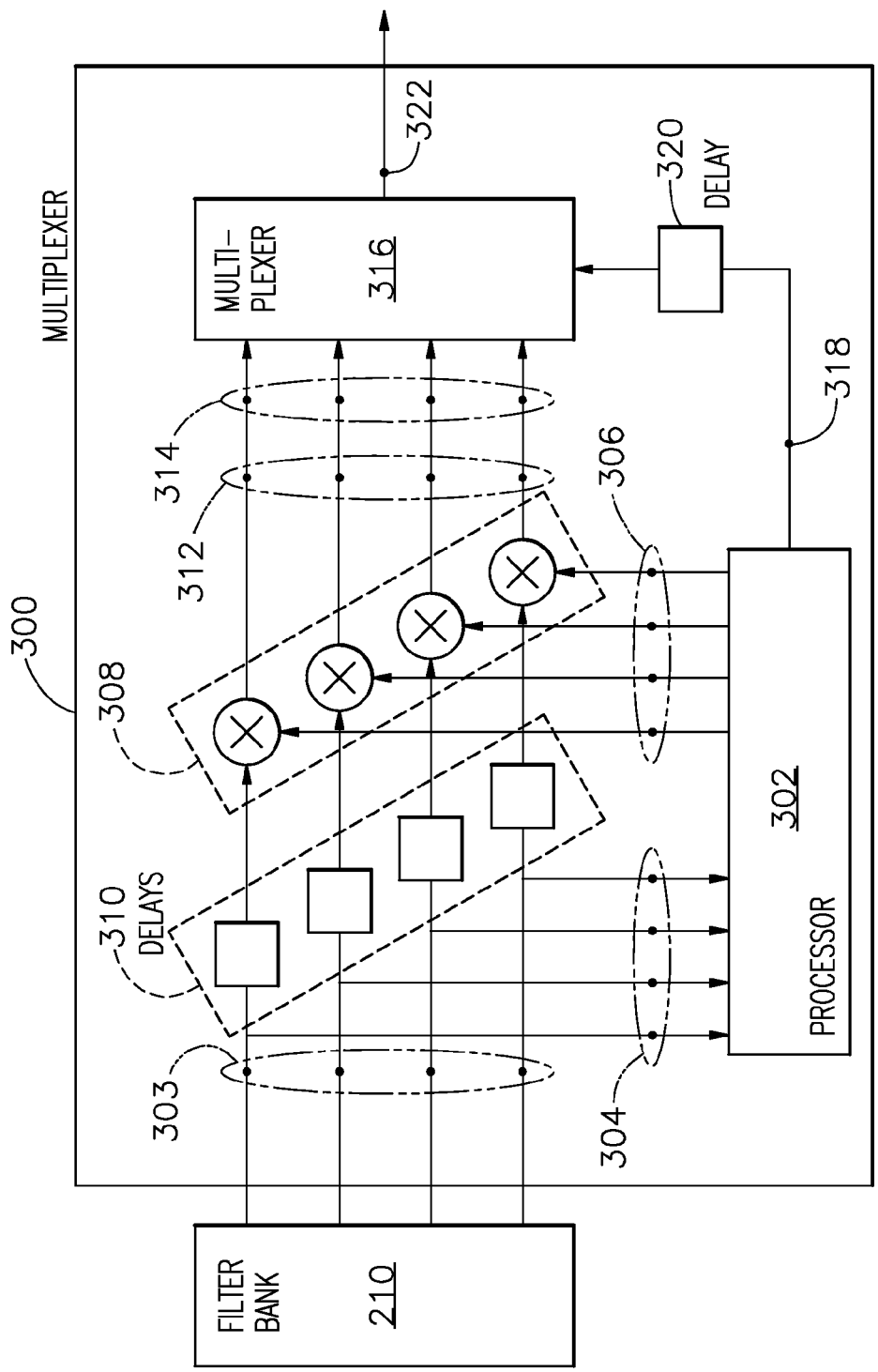
FIG. 3 is the autoscaling digital multiplexer of FIG. 2 according to a preferred exemplary embodiment of the present invention.

The filtered digital uplink signals 212 generated by the digital filter matrix 210 or the digital uplink signals received at the multiple inputs 202 are provided to the autoscaling digital multiplexer 300 for multiplexing (i.e., sending the multiple transformed digital uplink signals on the same channel). The autoscaling digital multiplexer 300 can be implemented with any number of multiplexing schemes in accordance with the present invention. FIG. 3 illustrates a simplified illustration of the autoscaling digital multiplexer 300 according to a preferred exemplary embodiment of the present invention.

Referring to FIG. 3, the transformed digital uplink signals generated by the digital transform matrix 210 are provided to the processor 302 at processor inputs 304, which are coupled to the digital transform matrix outputs 303. The processor 302, which can be implemented with software, hardware, or a combination of hardware and software, receives the transformed digital uplink signals presented at the processor inputs 304 and determines the scaling vector having an element (e.g., exponent) for each of the transformed digital uplink signals, which can be utilized to reduce the resolution for representing the transformed signal while providing a suitable fidelity. The processor 302 can determine each element of the scaling vector for each of the binary strings corresponding to the transformed digital uplink signals using any number of techniques known to those of ordinary skill in the art, which convert each of the binary strings to a digital floating point representation (i.e., sign bit, exponent, mantissa) For example, a sixteen (16) bit binary string can be represented with an eight (8) bit instantaneous fidelity with an eight (8) bit mantissa and a three (3) bit exponent. In addition, the processor 302 preferably evaluates the transformed digital uplink signals for saturation conditions and corrects such saturation if such a condition exists as discussed in the Schiemenz Reference.

Once the scaling vector is determined by the processor 302, each of the elements of the scaling vector is provided by the processor 302 at processor outputs 306 for generation of a mantissa for each of the transformed digital uplink signals. The processor outputs 306 are coupled to an operator 308, which preferably comprises one or more multipliers in accordance with the present invention. However, one of ordinary skill in the art will recognize that if the exponents are limited to powers-of-two, the operator 308 can be implemented in other manners, such as a selector that selects the mantissa from a subset of the binary string, or with a shifter that conducts a shifting operation based upon the exponent.

The operator 308 is also coupled to the digital transform matrix outputs 303 such that the operator 308 receives the transformed digital uplink signals in addition to the scaling vector (i.e., elements of the scaling vector) from the processor 302. Preferably, the digital transformed matrix outputs 303 are coupled to the operator 308 with delays 310 to synchronize the transformed digital uplink signals with the scaling vector generated by the processor 302. The operation performed by the operator 308 with the transformed digital uplink signals and the scaling vector produces a mantissa for each of the transformed digital uplink signals at the operator outputs 312, which are coupled to multiplexer inputs 314 of a multiplexer 316. As can be appreciated by one of ordinary skill in the art, the operator 308 can be incorporated into the functions provided by the processor 308, and the mantissa for each of the transformed digital uplink signals can be provided by the processor 302 to the multiplexer 316.

In addition to the mantissa for each of the transformed digital uplink signals, the multiplexer 316 is also configured to receive the scaling vector from the processor 302. The scaling vector can be provided to the multiplexer 316 in the form as presented to the operator 308 or preferably encoded before it is provided to the multiplexer 316. More specifically, the processor 308 preferably encodes the scaling vector and produces an encoded scaling vector, which is provided at an encoded output 318 that is coupled to the multiplexer 316, and preferably coupled to the multiplexer 316 with a delay 320 to synchronize the encoded scaling vector and the corresponding mantissas produced by the operator 308.

Figure 4:
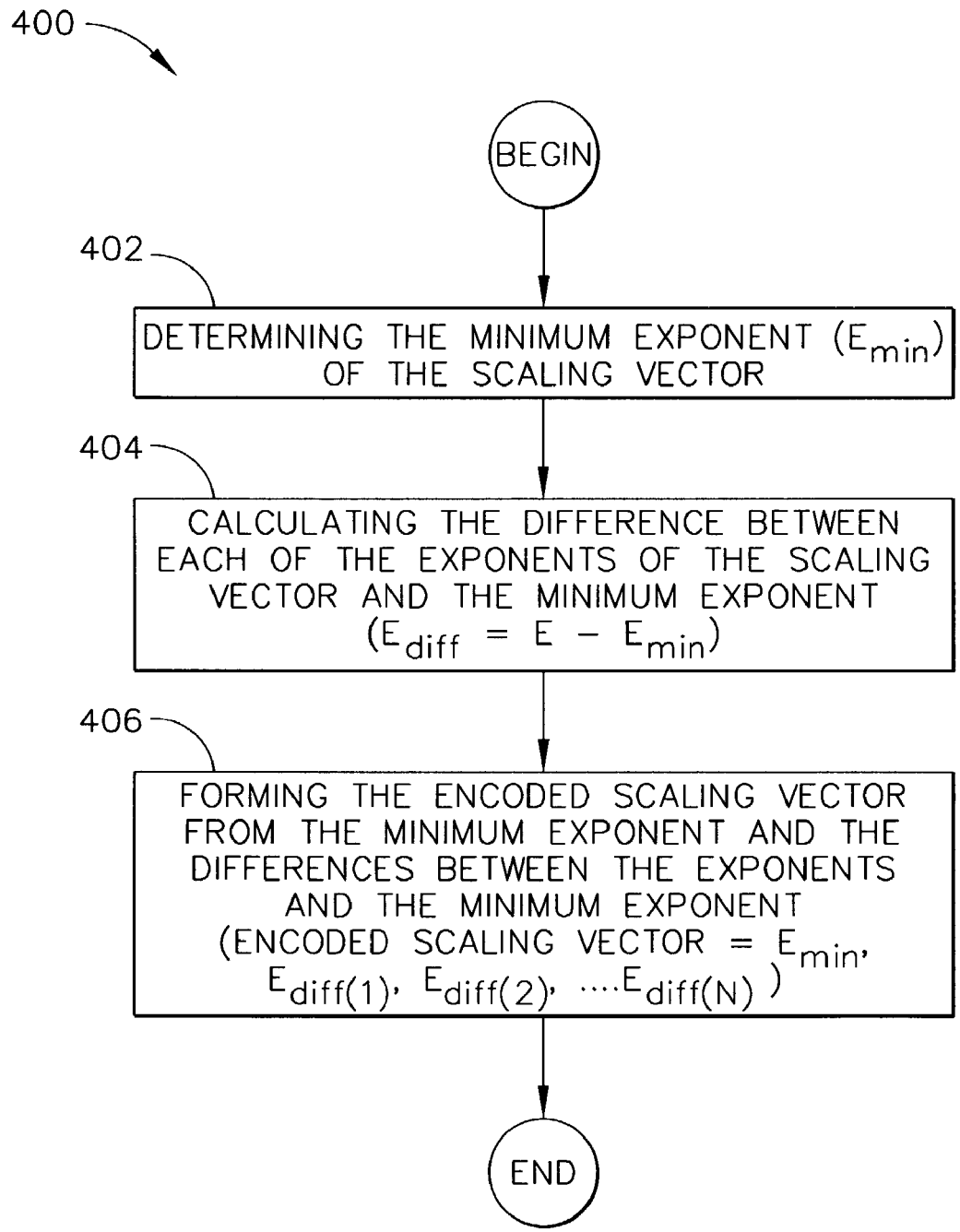
FIG. 4 is a method for encoding the scaling vector according to a preferred exemplary embodiment of the present invention.

Referring to FIG. 4, a method 400 for encoding the scaling vector is illustrated according to a preferred embodiment of the present invention. The method 400 comprises determining the minimum exponent ($E_{min}$) of the scaling vector 402 and calculating the difference between each of the elements (e.g., exponents) of the scaling vector and the minimum exponent 404 (i.e., $E_{diff}=E-E_{min}$). The method 400 further comprises forming the encoded scaling vector from the minimum exponent and the differences between the exponents and the minimum exponent 406 (e.g., encoded scaling vector=$[E_{min}, E_{diff(1)}, E_{diff(2)}, \ldots, E_{diff(N)}]$, where N is the number of exponents contained in the original scaling vector, which also corresponds to the number of transformed digital uplink signals.)

Figure 5:
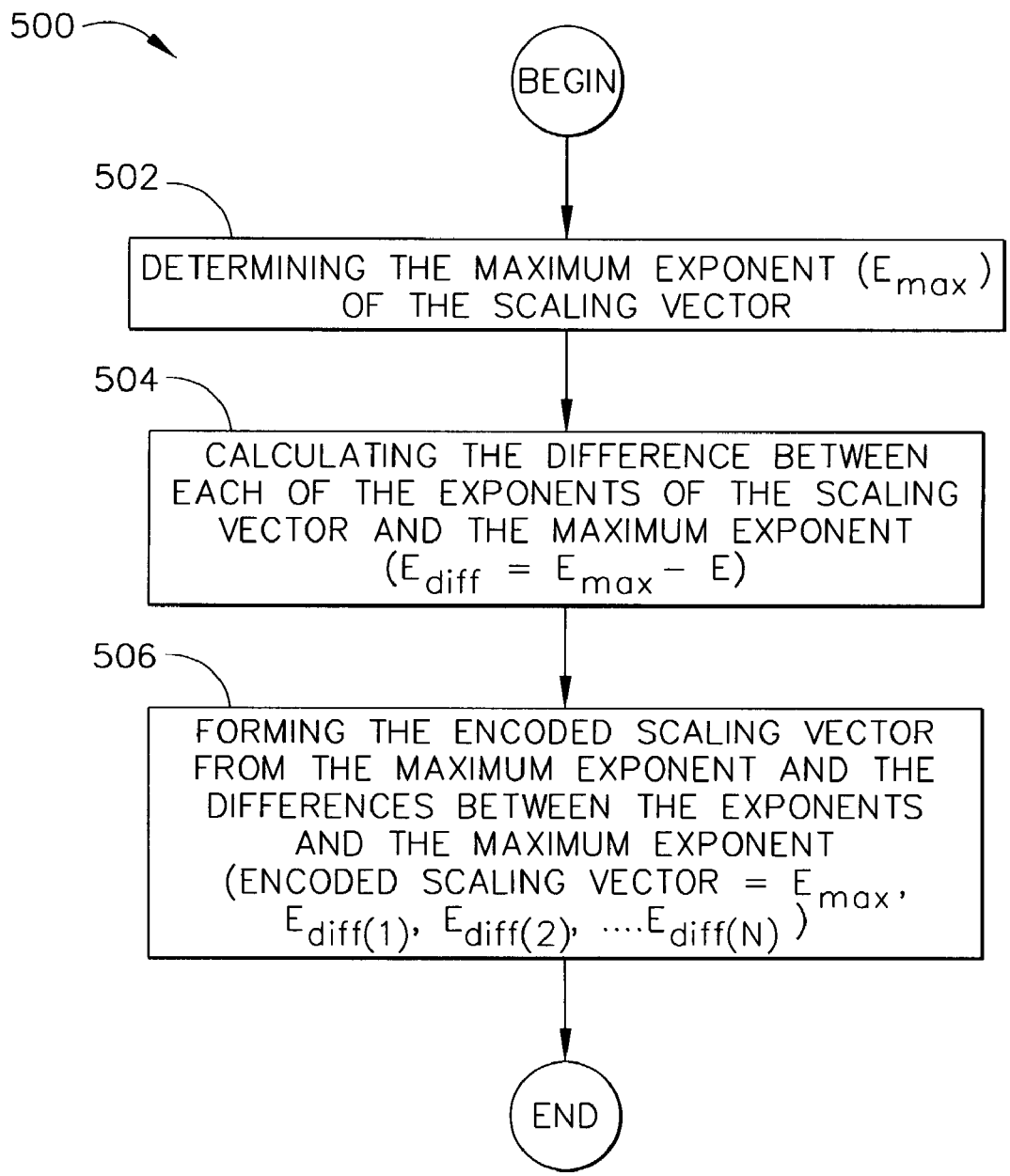
FIG. 5 is another method for encoding the scaling vector according to a preferred exemplary embodiment of the present invention.

Referring to FIG. 5, a second method 500 for encoding the scaling vector is illustrated according to a preferred exemplary embodiment of the present invention. The method 500 comprises determining the maximum exponent ($E_{max}$) of the scaling vector 502 and calculating the difference between the maximum exponent and each of elements (e.g., exponents) of the scaling vector 504 (i.e., $E_{diff}=E_{max}-E$). The method further comprises forming the encoded scaling vector from the maximum exponent and the differences between the maximum exponents and each of the exponents of the scaling vector 506 (e.g., encoded scaling vector=$[E_{min}, E_{diff(1)}, E_{diff(1)}, E_{diff(2)}, \ldots, E_{diff(N)}]$, where N is the number of exponents contained in the original scaling vector, which also corresponds to the number of transformed digital uplink signals.)

As can be appreciated by one of ordinary skill in the art, the peak amplitude of each of the transformed digital signals are substantially similar and the bandwidth preferably provided to transmit the scaling vector will be less than or equal to the product of the bits representing the scaling vector and the number of inputs to the autoscaling digital multiplexer 300. For example, four (4) bits of dynamic range may be desirable, but each of the inputs to the autoscaling digital multiplexer can be scaled with the selection of a single four (4) bit scaling element and selection of a one (1) bit scaling element for each of the inputs to identify if the exponent of each of the inputs is greater than the single four (4) bit scaling element. Therefore, the scaling vector is provided with the number of bits of dynamic range (D) plus the number of input (N) (i.e., D+N).

In accordance with another embodiment of the present invention, methods and apparatus that are well known to those of ordinary sill in the art can be utilized for encoding the scaling vector. For example, Huffman, Elias, Lempel-Ziv (e.g., LZW and LZ77) methods can be utilized in accordance with the present invention as well as adaptive methods implemented by Lynch-Davisson codes or Rissanen MDL. Furthermore, predictive encoding methods can be utilized in accordance with the present invention to select the encoding method and method parameters based upon present and past signal statistics and other constraints such as processing limitations, signal quality, and/or update latency, or the like, to produce the encoded scaling vector. (See U.S. Pat. No. 4,558,302, titled "HIGH SPEED DATA COMPRESSION AND DECOMPRESSION APPARATUS AND METHOD," issued on Dec. 10, 1985 to Welch, which is hereby incorporated by reference; U.S. Pat. No. 4,701,745, titled "DATA COMPRESSION SYSTEM," issued on Jan. 20, 1987 to Waterworth, which is hereby incorporated by reference; L. D. Davisson, UNIVERSAL NOISELESS CODING, IEEE Transactions on Information Theory, Vol. 19, No. 6, pp. 783-795, 1973, which is hereby incorporated by reference; T. J. Lynch, SEQUENCE TIME CODING FOR DATA COMPRESSION, Proc. IEEE, Vol. 54, pp. 1490-1491, Oct. 1966, which is hereby incorporated by reference; Peter Elias, UNIVERSAL CODEWORD SETS AND REPRESENTATIONS OF THE INTEGERS, IEEE Transactions on Information Theory, Vol. 21, No. 2, pp. 194-203, Mar. 1975, which is hereby incorporated by reference; David A. Huffman, A METHOD FOR CONSTRUCTION OF MINIMUM REDUNDANCY CODES, In Proceedings of the Institute of Radio Engineers, Vol. 40, pp. 1098-1101. Institute of Radio Engineers, Sep. 1952, which is hereby incorporated by reference; Jorma Rissanen, UNIVERSAL CODING, INFORMATION, PREDICTION, AND ESTIMATION, IEEE Transactions on Information Theory, Vol. 30, No. 4, pp. 629-636, Jul. 1984, which is hereby incorporated by reference; Jorma Rissanen and Jr. Glen G. Langdon, UNIVERSAL MODELING AND CODING, IEEE Transactions on Information Theory, Vol. 27, No. 1, pp. 12-23, Jan. 1981, which is hereby incorporated by reference; Jacob Ziv and Abraham Lempel, A UNIVERSAL ALGORITHM FOR SEQUENTIAL DATA COMPRESSION, IEEE Transactions on Information Theory, Vol. 23, No. 3, pp. 337-343, May 1977, which is hereby incorporated by reference; Jacob Ziv and Abraham Lempel, COMPRESSION OF INDIVIDUAL SEQUENCES VIA VARIABLE-RATE CODING, IEEE Transactions on Information Theory, Vol. 24, No. 5, pp. 530-536, Sep. 1978, which is hereby incorporated by reference.)

Referring to FIG. 3, and as previously described in this detailed description of the drawings, the encoded scaling vector or the scaling vector and the mantissa for each of the transformed digital uplink signals are provided to the multiplexer 316 for multiplexing (i.e., sending the multiple transformed digital uplink signals on the same channel). The multiplexer 316 can implement any number of multiplexing schemes in accordance with the present invention. For example, and according to a preferred embodiment of the present invention, a TDM scheme is used to interleave the bits or groups of bits. However, the present invention is applicable to other multiplexing schemes such as TDMA, FDMA, FDM, OFDM, OFDMA, CDMA and wavelength multiplexing as well as using packet labeling schemes that use different addresses to identify the different multiplexed signals such as Multiprotocol Label Switching (MPLS) or Asynchronous Transfer Mode (ATM). The digital composite signal 206 generated by the multiplexer 316 is provided at the autoscaling digital multiplexer output 322. The digital composite signal 206 provided at the autoscaling digital multiplexer output 322 is preferably encrypted according to the present invention.

Referring to FIG. 2, the digital composite signal 206 generated by the autoscaling digital multiplexer 300 is preferably encrypted by an encryptor 214. The encryptor 214 generally provides increased security for the digitally modulated composite signal 110 with a random scrambling of the binary data stream. Any number of encryption techniques known to those of ordinary skill in the art can be used, include DES, triple DES, AES, Kusami, linear recursive shift sequences, and non-linear recursive shift sequences.

The encrypted digital composite signal 216 generated by the encryptor 214 or the digital composite signal 206 produced by the autoscaling digital multiplexer 204 is provided to the digital modulator 208, which is configured to digitally modulate the encrypted digital composite signal 216 or the digital composite signal 206 to produce the digitally modulated composite signal 110. More specifically, the digital modulator 208 digitally modulates the encrypted digital composite signal 216 or the digital composite signal 206 onto one or more carries and polarizations to produce the digitally modulated composite signal 110. The digital modulator 208 is preferably selected to provide a desired bandwidth efficiency and hence capacity, with a pre-selected link availability. For example, according to a preferred embodiment of the present invention, one or more carriers with two polarizations, each containing an 8PSK waveform and a block code, is used at a Ka band. However, any number of modulation schemes can be used according to the present invention, such as trellis encoded 8PSK; 16QAM or higher levels of QAM using convolution, block, or block product codes suitable for turbo decoding. Once the digitally modulated composite signal is produced by the digital modulator 208, it is preferably post-processed and preferably transmitted with a single or multiple antenna configurations (not shown).

Figure 6:
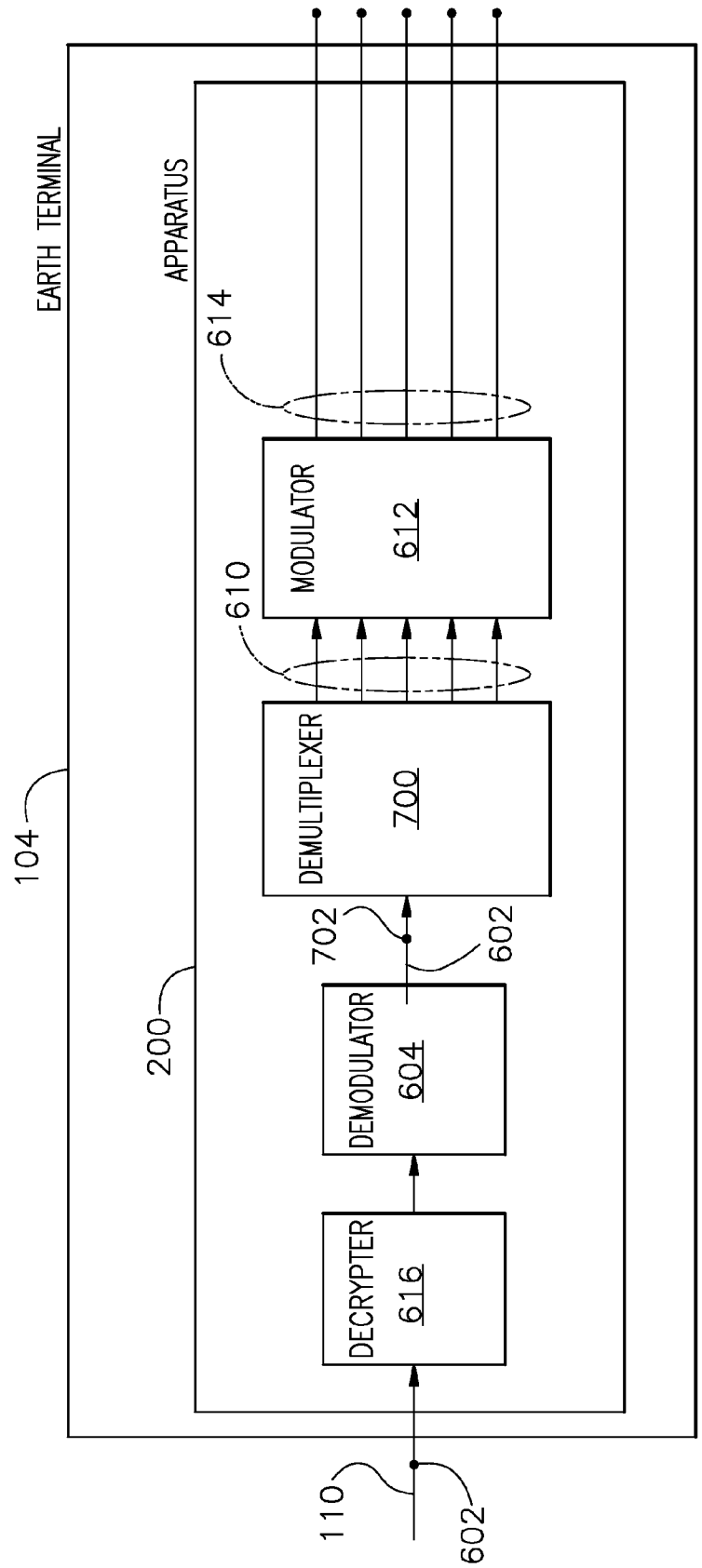
FIG. 6 is a simplified illustration the earth terminal of FIG. 1 having an apparatus for coupling the satellite to the earth terminal according to a preferred exemplary embodiment of the present invention.

Referring to FIG. 6, a simplified illustration of an earth terminal 104 having an apparatus 200 for coupling the satellite 102 as shown in FIG. 2 to the earth terminal 102 with the digitally modulated composite signal 110 (i.e., providing a downlink from the earth terminal to the satellite) is illustrated according to a preferred exemplary embodiment of the present invention. Generally, the apparatus 200 comprises an input 602 of the earth terminal 104 that is configured to receive the digitally modulated composite signal 110 and a digital demodulator 604 of the earth terminal 102 that is configured to digitally demodulate the digitally modulated composite signal to produce a second digital composite signal 606 generally corresponding to the digital composite signal 206 of FIG. 2. In addition, the apparatus 200 also comprises a autoscaling digital demultiplexer 700 of the earth terminal 104 that is configured to digitally separate the second digital composite signal 606 to produce a second plurality of digital uplink signals 610 generally corresponding to the plurality of digital uplink signals received by the inputs of the satellite 102 as described with reference to FIG. 2. Furthermore, the apparatus 200 comprises a modulator 612 of the earth terminal 104 that is configured to modulate the second plurality of digital uplink signals 610 to produce a plurality of modulated user information streams 614 (i.e., modulated analog signals). Lastly, the apparatus 200 preferably comprises a decryptor 616 that decrypts the encrypted encrypted digital composite signal 216 generated by the encryptor 214 of FIG. 2, if such an encryptor 214 is utilized by the satellite 102.

As previously described in this detailed description of the drawings, the digitally modulated composite signal 110 received at the input 602 of the satellite 102 is provided to the digital demodulator 604, and provided to the digital demodulator 604 after decryption if the digitally modulated composite signal 110 was originally encrypted at the earth terminal. More specifically, the digital demodulator 604 digitally demodulates the digitally modulated composite signal 110 from the one or more carriers and polarizations, as originally modulated by the digital modulator 208 of the satellite 102 as described with reference to FIG. 2, to produce the second digital composite signal 606 generally corresponding to the digital composite signal 206 of FIG. 2.

Figure 7:
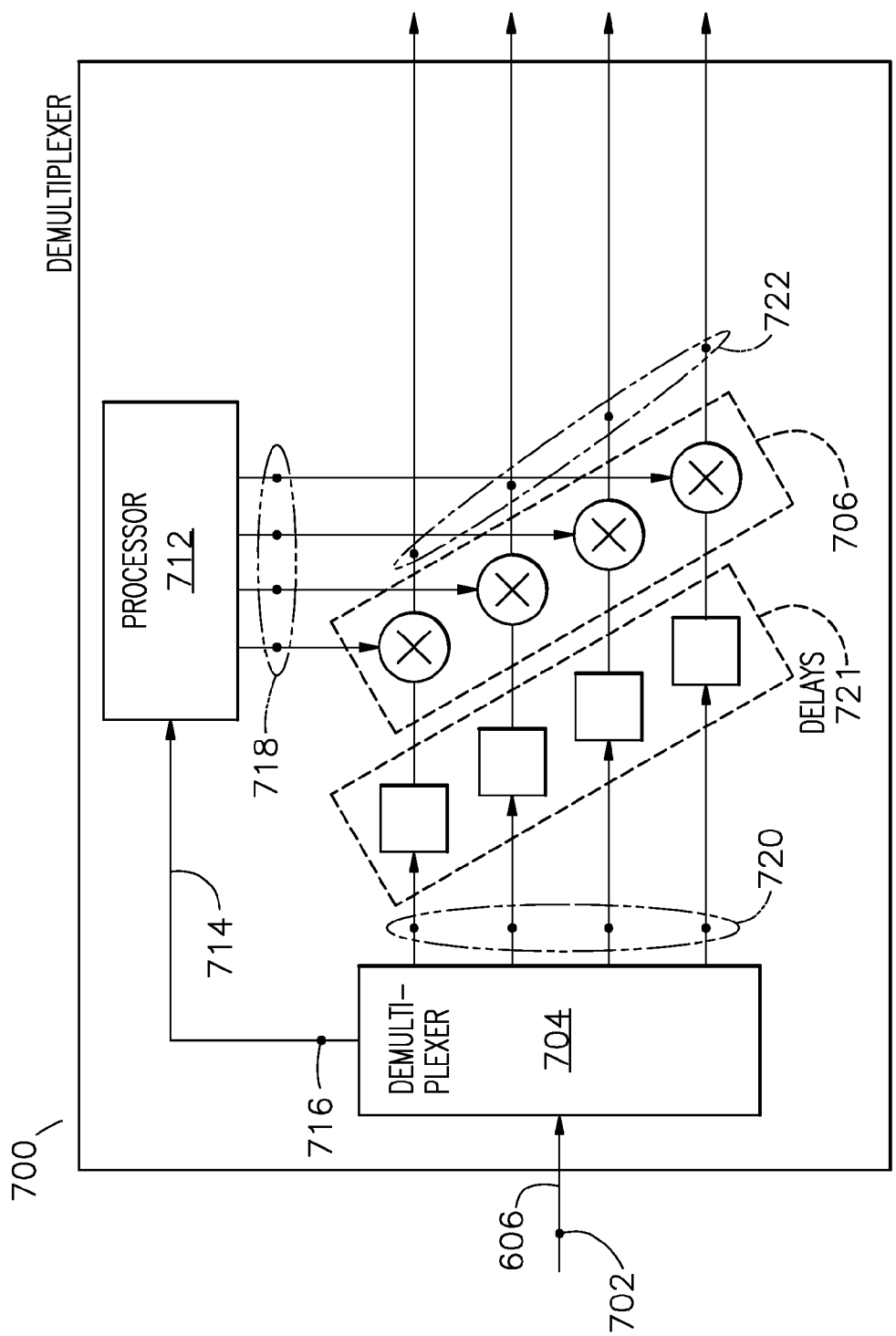
FIG. 7 is the autoscaling digital demultiplexer of FIG. 6 according to a preferred exemplary embodiment of the present invention.

Once the second digital composite signal 606 is produced by the digital demodulator 604, the second digital composite signal 606 is provided to the autoscaling digital demultiplexer 608 for demultiplexing (i.e., separating the second digital composite signal transmitted on the same channel into the multiple digital uplink signals) The autoscaling digital demultiplexer 700 can be implemented with any number of demultiplexing schemes corresponding to the multiplexing scheme implemented by the autoscaling digital multiplexer 300 of FIG. 2 in accordance with the present invention. FIG. 7 illustrates a simplified illustration of the autoscaling digital demultiplexer 700 according to a preferred exemplary embodiment of the present invention.

Referring to FIG. 7, the second digital composite signal received at the multiplexed input 702 is provided to a demultiplexer 704 to separate (i.e., demultiplex) the mantissas and the encoded scaling vector. Preferably, the demultiplexer 704 separates the mantissas and the encoded scaling vector, which is provided to a processor 712 at a processor input 714 that is coupled to a demultiplexer output 716. The processor 712, which can be implemented with software, hardware, or a combination of hardware and software, receives the encoded scaling vector and decodes the encoded scaling vector to produce the scaling vector for each of the mantissas (i.e., produces the exponent for each of the mantissas. The decoding operation performed by the processor 712 corresponds to encoding scheme used by the processor 302 described with reference to FIG. 3. For example, the decoding operation for the encoding method describe with reference to FIG. 5 would comprise adding the difference for each element to the minimum exponent and the decoding operation for encoding method described with reference to FIG. 6 would comprise subtracting the difference for each element from the maximum exponent. However, these examples are not intended to limit the invention as other decoding operations are within the scope of the present invention.

Once the scaling vector is decoded by the processor 712 or the scaling vector that was not originally encoded is produced by the demultiplexer, the scaling vector and the mantissa are provided to an operator 706, which in a preferred embodiment comprises one or more multipliers. The operator 706 is coupled to processor outputs 718 and/or the demultiplexer outputs 720 to receive the scaling vector and the mantissas, and the operator 706 produces the digital uplink signals for each of the mantissas and the corresponding scaling vectors at operator outputs 722. Preferably, the operator 706 is coupled to the demultiplexer outputs 720 with delays 721 to synchronize the digital mantissas produced by the demultiplexer 704 with the decoded scaling vector produced by the processor 712 if such decoding is performed by the processor 712.

Referring to FIG. 6, the outputs of the autoscaling digital demultiplexer 700 are coupled to the inputs of the uplink modulator 612 that is configured to demodulate the second plurality of digital uplink signals 610 to produce the plurality of user information streams 614. The modulator 612 converts the digital baseband representation to the uplink signal for transmission over communications link 114 as shown in FIG. 1. For example, digital communications signal at the multiple inputs 202 are preferably the composite of the uplink signals from the user equipment that is a binary encoded baseband representation of WCDMA signals external interfering signals and noise, and uplink modulator 612 preferably converts digital uplink signals 610 to the plurality of user information streams 614 that represent the information being transmitted by the user equipment. For example, the information streams 614 can represent digitally encoded voice, email, facsimile, images, video or other packet or circuit data. In this example, uplink demodulator 612 can be realized using a RAKE receiver and FED as used for UMTS and implemented with the Node B and RNC equipment.

It should be appreciated that the present invention provides numerous desirable features including maintenance of signal fidelity by transmitting a digital representation of the signal that is then converted in the earth terminal to an analog signal, which is subsequently provided to a network, rather than transmitting an analog signal to the earth terminal for transmission to the network. In this way, fading on the downlink from the satellite to the earth terminal is not correlated with the amplitude on the uplink. Furthermore, because the fidelity is maintained by the present invention, the signals can be mathematically manipulated at the satellite and/or the earth terminal in order to perform beam forming as the amplitude and phase characteristics between feed elements is maintained with the present invention. In addition, by adaptively block scaling each of the digital data streams, the RF bandwidth of the satellite link is minimized while maximizing the dynamic range. Each of the carrier/beam channels is independent with the separate digital data stream representations. Also, a large channel is less likely to cause an increase in the noise floor of another channel, and large dynamic range differences are supported between beams and carriers since each has its own individual exponent, thereby keeping the channels relatively independent. In accordance with the present invention, other desirable features are present such as within a single beam and carrier, the dynamic range and signal fidelity can be individually adjusting by varying the size of the mantissa, and by multiplexing the digital data streams, failed components on the satellite can easily be routed using alternative paths and/or spare components inserted. The use of a digital data stream and digitally implemented transform operation also permits this transform math to be changed to compensate for a failed power amplifier, change in amplifier performance or change in the analog output transform. As little more than a Digital to Analog conversion is being performed on the satellite it can be built into a small, low power and hence to support a relatively low satellite price, and digital circuits are inherently repeatable where analog circuits are not, reducing the manufacturing and test times and hence the payload cost.

In addition to the foregoing, the methods and apparatus present significant benefits that would be apparent to one or ordinary skill in the art. Furthermore, while a preferred exemplary embodiment has been presented in the foregoing description of the drawings, it should be appreciated that a vast number of variations in the embodiments exist. Lastly, it should be appreciated that these embodiments are preferred exemplary embodiments only, and are not intended to limit the scope, applicability, or configuration of the invention in any way. Rather, the foregoing detailed description provides those skilled in the art with a convenient road map for implementing a preferred exemplary embodiment of the invention. It being understood that various changes may be made in the function and arrangement of elements described in the exemplary preferred embodiment without departing from the spirit and scope of the invention as set forth in the appended claims.

What is claimed is:

1. An apparatus for coupling a satellite to an earth terminal, comprising:
    a plurality of inputs of the satellite configured to receive a plurality of digital uplink signals;
    an autoscaling digital multiplexer of the satellite configured to digitally multiplex said plurality of digital uplink signals to produce a digital composite signal;
    a digital modulator of the satellite configured to digitally modulate said digital composite signal to produce a digitally modulated composite signal;
    an input of the earth terminal configured to receive said digitally modulated composite signal;
    a digital demodulator of the earth terminal configured to digitally demodulate said digitally modulated composite signal received by said input of the earth terminal to produce a second digital composite signal;
    an autoscaling digital demultiplexer of the earth terminal configured to digitally separate said second digital composite signal into a second plurality of digital uplink signals; and
    a modulator of the earth terminal configured to modulate said second plurality of digital uplink signals to produce a plurality of modulated analog signals.

2. The apparatus for coupling the satellite to the earth terminal of claim 1, wherein said plurality of digital uplink signals are Third Generation Partnership Project (3GPP) Wideband Code Division Multiple Access (WCDMA) Direct Sequence Spread Spectrum (DSSS) signals.

3. The apparatus for coupling the satellite to the earth terminal of claim 1, further comprising a digital filter bank of the satellite that is configured to digitally filter said plurality of digital uplink signals.

4. The apparatus for coupling the satellite to the earth terminal of claim 1, wherein the autoscaling digital multiplexer of the satellite comprises:
    a processor configured to generate a scaling vector for said plurality of digital uplink signals;
    an operator configured to produce a mantissa for each of said plurality of digital uplink signals with said scaling vector and said plurality of digital uplink signals; and
    a multiplexer configured to multiplex said mantissa for each of said plurality of digital uplink signals and said scaling vector to produce said digital composite signal.

5. The apparatus for coupling the satellite to the earth terminal of claim 4, wherein said processor is configured to encode said scaling vector.

6. The apparatus for coupling the satellite to the earth terminal of claim 4, wherein said processor is configured to:
    determine a minimum exponent of said scaling vector;
    calculate a difference between each of the exponents of said scaling vector and said minimum exponent; and
    form an encoded scaling vector from said minimum exponent and said difference between each of the exponents of said scaling vector and said minimum exponent.

7. The apparatus for coupling the satellite to the earth terminal of claim 4, wherein said processor is configured to:
    determine a maximum exponent of said scaling vector;
    calculate a difference between said maximum exponent of said scaling vector and each of the exponents of said scaling vector; and
    form an encoded scaling vector from said maximum exponent and said difference between said maximum exponent and each of the exponents of said scaling vector.

8. The apparatus for coupling the satellite to the earth terminal of claim 4, wherein said processor is configure to perform a Huffman encoding to encode said scaling vector.

9. The apparatus for coupling the satellite to the earth terminal of claim 4, wherein said multiplexer is configured to Time Division Multiplexing (TDM) said mantissa for each of said plurality of digital uplink signals and said scaling vector.

10. The apparatus for coupling the satellite to the earth terminal of claim 1, further comprising an encryptor configured to encrypt the digital composite signal.

11. The apparatus for coupling the satellite to the earth terminal of claim 1, wherein said autoscaling digital demultiplexer of the earth terminal comprises:
    a demultiplexer configured to separate a plurality of mantissas and an encoded scaling vector from said second digital composite signal;
    a processor configured to decode the encoded scaling vector to produce a scaling vector for each of said plurality of mantissas; and
    an operator configured to produce said second plurality of digital uplink signals with said plurality of mantissas and said scaling vector.

12. The apparatus for coupling the satellite to the earth terminal of claim 1, further comprising an analog transform matrix of said earth terminal that is configured to transform said plurality of modulated analog signals into a plurality of transformed analog signals.

13. An method for coupling a satellite to an earth terminal, comprising:
    receiving a plurality of digital uplink signals with a plurality of inputs of the satellite;
    digitally multiplexing said plurality of digital uplink signals with an autoscaling digital multiplexer of the satellite to produce a digital composite signal;
    digitally modulating said digital composite signal with a digital modulator of the satellite to produce a digitally modulated composite signal;
    receiving said digitally modulated composite signal with an input of the earth terminal;
    digitally demodulating said digitally modulated composite signal with a digital demodulator of the earth terminal to produce a second digital composite signal;

digitally separating said second digital composite signal into a second plurality of digital uplink signals with an autoscaling digital demultiplexer of said earth terminal; and modulating said second plurality of digital uplink signals with a modulator of the earth terminal to produce a plurality of modulated analog signals.

14. The method for coupling the satellite to the earth terminal of claim 13, wherein said plurality of digital uplink signals are Third Generation Partnership Project (3GPP) Wideband Code Division Multiple Access (WCDMA) Direct Sequence Spread Spectrum (DSSS) signals.

15. The method for coupling the satellite to the earth terminal of claim 13, further comprising digitally filtering said plurality of digital uplink signals with a digital filter of the satellite.

16. The method for coupling the satellite to the earth terminal of claim 13, wherein said digitally multiplexing said plurality of digital uplink signals with said autoscaling digital multiplexer of the satellite to produce said digital composite signal, comprises:
    generating a scaling vector for said plurality of digital uplink signals;
    producing a mantissa for each of said plurality of digital uplink signals with said scaling vector and said plurality of digital uplink signals; and
    multiplexing said mantissa for each of said plurality of digital uplink signals and said scaling vector.

17. The method for coupling the satellite to the earth terminal of claim 16, further comprising encoding said scaling vector.

18. The method for coupling the satellite to the earth terminal of claim 16, further comprising:
    determining a minimum exponent of said scaling vector;
    calculating a difference between each of the exponents of said scaling vector and said minimum exponent; and
    forming an encoded scaling vector from said minimum exponent and said difference between each of the exponents of said scaling vector and said minimum exponent.

19. The method for coupling the satellite to the earth terminal of claim 16, further comprising:
    determining a maximum exponent of said scaling vector;
    calculating a difference between said maximum exponent of said scaling vector and each of the exponents of said scaling vector; and
    forming an encoded scaling vector from said maximum exponent and said difference between said maximum exponent and each of the exponents of said scaling vector.

20. The method for coupling the satellite to the earth terminal of claim 13, further comprising performing a Huffman encoding to encode said scaling vector.

21. The method for coupling the satellite to the earth terminal of claim 16, wherein said multiplexing is a Time Division Multiplexing (TDM) of said mantissa for each of said plurality of digital uplink signals and said scaling vector.

22. The method for coupling the satellite to the earth terminal of claim 13, further comprising encrypting said digital composite signal.

23. The method for coupling the satellite to the earth terminal of claim 13, wherein said digitally separating said second digital composite signal into a second plurality of digital uplink signals comprises:
    separating a plurality of mantissas and an encoded scaling vector from said second digital composite signal;
    decoding the encoded scaling vector to produce a scaling vector for each of said plurality of scaling vectors;
    producing said second plurality of digital uplink signals with said plurality of mantissa and said scaling vector.

24. A communication system, comprising:
a satellite comprising:
    a plurality of inputs configured to receive a plurality of digital uplink signals;
    an autoscaling digital multiplexer configured to digitally multiplex said plurality of digital uplink signals to produce a digital composite signal; and
    a digital modulator configured to digitally modulate said digital composite signal to produce a digitally modulated composite signal; and
an earth terminal coupled to said satellite with said digitally modulated composite signal, said earth terminal comprising:
    an input configured to receive said digitally modulated composite signal;
    a digital demodulator configured to digitally demodulate said digitally modulated composite signal received by said input to produce a second digital composite signal;
    a autoscaling digital demultiplexer configured to digitally separate said second digital composite signal into a second plurality of digital uplink signals; and
    a modulator configured to modulate said second plurality of digital uplink signals to produce a plurality of modulated analog signals.

25. The communication system of claim 24, wherein said plurality of digital uplink signals are Third Generation Partnership Project (3GPP) Wideband Code Division Multiple Access (WCDMA) Direct Sequence Spread Spectrum (DSSS) signals.

26. The communication system of claim 24, said satellite further comprising a digital filter that is configured to digitally filter said plurality of digital uplink signals.

27. The communication system of claim 24, wherein said autoscaling digital multiplexer comprises:
    a processor configured to generate a scaling vector for said plurality of digital uplink signals;
    an operator configured to produce a mantissa for each of said plurality of digital uplink signals with said scaling vector and said plurality of digital uplink signals; and
    a multiplexer configured to multiplex said mantissa for each of said plurality of digital uplink signals and said scaling vector to produce said digital composite signal.

28. The communication system of claim 27, wherein said processor is configured to encode said scaling vector.

29. The communication system of claim 27, wherein said processor is configured to:
    determine a minimum exponent of said scaling vector;
    calculate a difference between each of the exponents of said scaling vector and said minimum exponent; and
    form an encoded scaling vector from said minimum exponent and said difference between each of the exponents of said scaling vector and said minimum exponent.

30. The communication system of claim 27, wherein said processor is configured to:
    determine a maximum exponent of said scaling vector;
    calculate a difference between said maximum exponent of said scaling vector and each of the exponents of said scaling vector; and form an encoded scaling vector from said maximum exponent and said difference between said maximum exponent and each of the exponents of said scaling vector.

31. The communication system of claim 27, wherein said processor is configure to perform a Huffman encoding to encode said scaling vector.

32. The communication system of claim 27, wherein said multiplexer is configured to Time Division Multiplexing (TDM) said mantissa for each of said plurality of digital uplink signals and said scaling vector.

33. The communication system of claim 24, further comprising an encryptor of the satellite, the encryptor configured to encrypt the digital composite signal.

34. The communication system of claim 24, wherein said autoscaling digital demultiplexer comprises:

a demultiplexer configured to separate a plurality of mantissas and an encoded scaling vector from said second digital composite signal;

a processor configured to decode the encoded scaling vector to produce a scaling vector for each of said plurality of mantissas; and an operator configured to produce said second plurality of digital uplink signals with said plurality of mantissas and said scaling vector.

35. The communication system of claim 24, further comprising an analog transform matrix configured to transform said plurality of modulated analog signals into a plurality of transformed analog signals.

* * * * *